(12) United States Patent
Carames Jimenez

(10) Patent No.: US 10,309,505 B2
(45) Date of Patent: Jun. 4, 2019

(54) CONTINUOUSLY VARIABLE AUTOMATIC TRANSMISSION

(71) Applicant: Jose Antonio Carames Jimenez, El Vendrell (ES)

(72) Inventor: Jose Antonio Carames Jimenez, El Vendrell (ES)

( * ) Notice: Subject to any disclaimer, the term of this patent is extended or adjusted under 35 U.S.C. 154(b) by 379 days.

(21) Appl. No.: 15/316,843

(22) PCT Filed: May 15, 2015

(86) PCT No.: PCT/ES2015/070390
§ 371 (c)(1),
(2) Date: Dec. 7, 2016

(87) PCT Pub. No.: WO2015/189448
PCT Pub. Date: Dec. 17, 2015

(65) Prior Publication Data
US 2017/0097072 A1    Apr. 6, 2017

(30) Foreign Application Priority Data

Jun. 12, 2014 (ES) .................................. 201430904

(51) Int. Cl.
*F16H 33/06* (2006.01)
*B62M 1/10* (2010.01)

(52) U.S. Cl.
CPC ............... *F16H 33/06* (2013.01); *B62M 1/10* (2013.01); *B62M 1/105* (2013.01)

(58) Field of Classification Search
CPC .......... F16H 33/06; B62M 1/10; B62M 1/105
See application file for complete search history.

(56) References Cited

U.S. PATENT DOCUMENTS

| 1,374,797 A | 4/1921 | Zaborsky |
| 1,904,530 A | 4/1933 | Rathbun |
| 2,384,110 A | 9/1945 | Malmquist |
| 2,668,459 A | 2/1954 | Berklege |

(Continued)

FOREIGN PATENT DOCUMENTS

| DE | 343558 | 11/1921 |
| GB | 253416 | 6/1926 |
| WO | WO 2015/189448 | 12/2015 |

OTHER PUBLICATIONS

International Search Report and the Written Opinion dated Jul. 30, 2015 From the Oficina Espanola de Patentes y Marcas Re. Application No. PCT/ES2015/070390 and Its Translation of Search Report Into English. (11 Pages).

*Primary Examiner* — David M Fenstermacher

(57) ABSTRACT

The invention relates to a continuously variable automatic transmission that modifies the transmission ratio thereof by means of the accumulation and conversion of potential and kinetic energy. The transmission, which is functionally formed around a device accumulating elastic potential energy (6) with a controlled (7) output (2), has an inflow system (5) suitable for distributing the energy that is absorbed, and an outflow system (9) suitable for delivering the potential energy that has been absorbed and converting it into kinetic energy. The accumulator of elastic potential energy is formed around an elastic spiral spring, the inlet thereof being arranged so as to only allow the inflow of energy and the outlet thereof so as to control the energy delivery.

5 Claims, 8 Drawing Sheets

(56) References Cited

U.S. PATENT DOCUMENTS

| | | | | |
|---|---|---|---|---|
| 3,934,481 | A | * | 1/1976 | Foster .................... B62M 11/04 476/2 |
| 6,019,385 | A | | 2/2000 | Kelley et al. |
| 6,689,012 | B2 | * | 2/2004 | Miller .................... B62M 11/12 476/37 |
| 7,762,919 | B2 | * | 7/2010 | Smithson ................ F16H 15/28 476/36 |
| RE41,892 | E | * | 10/2010 | Miller .................... B62K 3/002 476/36 |
| 7,871,353 | B2 | * | 1/2011 | Nichols .................. F16H 15/28 476/37 |
| 8,167,759 | B2 | * | 5/2012 | Pohl ........................ F02B 67/04 475/189 |
| 8,608,609 | B2 | * | 12/2013 | Sherrill .............. F02D 41/0007 475/159 |
| 8,738,255 | B2 | * | 5/2014 | Carter ................ B60L 11/1805 701/61 |

* cited by examiner

CONTINUOUSLY VARIABLE AUTOMATIC TRANSMISSION

RELATED APPLICATIONS

This application is a National Phase of PCT Patent Application No. PCT/ES2015/070390 having International filing date of May 15, 2015, which claims the benefit of priority of Spanish Patent Application No. P201430904 filed on Jun. 12, 2014. The contents of the above applications are all incorporated by reference as if fully set forth herein in their entirety.

FIELD AND BACKGROUND OF THE INVENTION

The present invention falls within the technical sector of mechanics, within the sector of manufacturing transmissions with transmission ratio change, also known as gear boxes.

The object of the present invention is a device that serves as a movement transmission system with continuously variable automatic transmission ratio change. The application of this transmission system is especially applicable to bicycles and other light transport vehicles.

Within the assembly of gear change systems, the invention more specifically falls within the assembly of continuously variable gear change systems. Within the aforementioned sector, the aim of the invention being filed is a transmission system that may automatically and continuously change the transmission ratio thereof, especially suited for use in bicycles.

Today, within the sector for manufacturing transport vehicles, the solution for adapting the speed and torque of the engine device used to the speed and torque used in the wheels or output of the vehicle uses different transmission systems that incorporate systems with changes in the transmission or gear change ratio, in order to adapt the torque of the device to different load and terrain characteristics by means of the different transmission ratios.

On one hand, there are transmissions or gear boxes with a specific number of transmission ratios, the actuation of which may be manual or automatic. We will not deal with this type of transmission since they are substantially different to the type that is proposed and there is no reason to mention some of the many patents filed on said systems.

On the other hand, there are transmission systems with continuously variable transmission ratio between the input and the output. These are desirable for more precise adaptation to different load circumstances and power availability of the system. In addition, they enable maximum variation smoothness between the margins of available transmission ratios.

The aforementioned continuous gear change systems may be used for many types of transport vehicles as an alternative to change systems with a specific number of transmission or speed ratios. Continuous gear changes enable the transmission ratio thereof to change continuously and the ratio variation may be manual or automatic. Specifically for the use thereof in very light transport vehicles, the need to have another type of these continuous transmission ratio change systems, which are economic, simple to use and automatic, is considered.

The transmission system we are concerned with belongs to this group of more specialised transmissions that are of the type with continuous and variable transmission ratio, we will specifically refer to the state of the art of this type of transmission below.

The continuous changes in transmission ratio that are currently known are mainly of the following type:

Those commonly referred to as CVT, where two adjustable opening pulleys are connected via a belt or chain that is adapted to the step variations thereof. This type has been applied to many cars and other vehicles.

Several systems where two discs, one driving and another driven, are connected by an assembly of intermediate elements, the position adjustment of which varies the rolling radii of the connected discs and, therefore, the transmission ratio thereof, the U.S. Pat. No. 6,241,636 by Miller is an example of said systems, and there have been many different designs of these systems with different operating accessories.

Epicyclic gear train systems, where the adjustment of the relative rotation of a planet and sun gear assembly determines the adjustment of the transmission ratio.

Oscillating drive transmission systems, where a back-and-forth push on a lever arm, the shaft of which is connected to a freewheel system, transforms into a continuous rotation, in this system, in order to vary the transmission ratio it is possible to adjust the work distance of the lever arm.

Systems where the connection between the input and output is carried out periodically, using the moments of coincidence of torque requirements.

The U.S. Pat. No. 5,334,115 by Pires describes an oscillating ratchet style transmission.

Unlike the different systems used previously, the present invention focuses on a new automatic and continuous variable transmission ratio change system, which is completely different to the systems that have been used to date, since it is not based on ratio changes in pulleys or gears, or even on the rolling ratio change of two rotating discs connected via spheres or cones that vary their angular position, having in common with the oscillating drive transmissions the fact that the internal operation thereof is discontinuous, the system presented achieves, in a different manner, transmission ratio changes in the rotation between the input and output, by means of the control of the accumulation and exchange of potential and kinetic energy of the system, thereby controlling the transmission ratio between the input and output of the device.

In a manner that is completely different to the changes known to date, the automatic and continuously variable transmission that is described in the present specification, simplified in the operation thereof, uses a rotation input device with the ability to transfer rotation and energy to the input of an elastic potential energy storage unit, which may only release energy by means of the rotation of the output thereof, the rotation of the same being controlled by means of a blocking and release device, which enables the elastic potential energy to be released by means of rotation, in order to transform the elastic potential energy accumulated in the unit into rotation available in the output shaft thereof that is transformed into kinetic energy. By conserving energy between the input and output, the device described in the present specification adjusts the ratio between the input rotation speed and the output of the change to the most optimal depending on the input torque and the output torque requirements.

It is desirable, especially for bicycles, to have a continuously variable transmission available on the market that automatically carries out its transmission ratio variations, thus removing the need to continuously select the gear that is appropriate for the road, and enabling proper driving.

In order to cover this need, the transmission system described in the present specification enables gear boxes of varying complexity to be manufactured, including the simplest for use in bicycles or light vehicles. The aim of the invention is a device conceived to cover a gap in the market in the need described in the state of the art that we have described.

SUMMARY OF THE INVENTION

The present invention relates to a continuous transmission or gear change, which, by being adjustable in its behaviour, automatically modifies the transmission ratio between the input and output thereof, the transmission has a rotational input shaft and a rotational output shaft linked by means of a system for accumulating and converting potential and kinetic energies, such that the rotation of the input shaft may transmit rotation to the output shaft, with a transmission ratio that is a function of the adjustment of the system, torque and speed applied to the input, and the torque requirements at the output, such that the rotation speed of the output is determined by the transmission ratio that automatically determines at that moment the status of the transmission system.

Essentially, when the rotational movement is received from the input shaft of the transmission, rotation is transmitted to the input of an energy accumulation system that accumulates energy when rotation is induced in the input thereof and may only release the accumulated energy from the output thereof. The system has means for controlling the rotation of the output of the accumulator, such that when the actuation of this output is controlled, the released energy and the characteristics thereof are controlled.

The energy accumulation system used in a preferred embodiment, is an elastic potential energy accumulation system that uses a spiral spring, the inner end of which is fastened to the input and the outer end is fastened to a cylindrical body, the accumulation system is charged via the relative rotation of the input thereof with respect to the output thereof, it is arranged at the input of a unidirectional device, which only enables energy charging from the input, in order to be able to release the accumulated energy it must be released from the output, such that, by having control over the rotation of the cylindrical body of the output, the accumulated energy may be released in a controlled manner.

The energy charge in the elastic accumulator involves an increase in the elastic tension between the input and output, such that the tension of the system and torque required for the charging thereof from the input is controlled by controlling the discharge through the output of the control system thereof. As such, the control that operates on the output determining the output torque values, likewise determines the necessary values in the input in order to recharge the accumulator.

By controlling the output of the elastic accumulator, we have control over the rotation torque in the output sections, given the rotation torque delivered at the output, the rotation speed of the same is limited by the braking torque opposing the rotation that is a function of the charge situation of the system and the assembly of the inertial mass to accelerate, both rotational and linear.

In a preferred embodiment of the controlled output device, it uses an adjustable passage or blocking or energy break system, which is carried out such that a specific torque must be applied in order to enable the passage in a specific rotation position, once the break position in the output shaft is overcome, an available torque is available during a specific rotation radius until the next blocking position is reached. The controlled output device enables the output rotation pulses or sections depending on the desired torque in the output.

Given that the energy delivery of the elastic accumulator with controlled output are in discontinuous sections, the output of the aforementioned accumulator with controlled output is connected to the input of a system for filtering the discontinuous sections to convert them into a continuous rotation output. To do so, the output of the accumulator is connected to the filter system by means of a unidirectional device, such that it may transmit the rotation sections, enabling the filter system to rotate in the rotation direction, performing more revolutions than the output of the accumulator. The filter system has a fast energy accumulator, which by absorbing the rotation pulses originating from the accumulator with controlled output at the input thereof, continuously releases the rotation at its output, this output having an inertial mass associated with the output rotation of the transmission, which contributes to making the steps between drive sections smoother.

In a preferred embodiment, the filtration system uses, at the input thereof, a freewheel device connected to the input of a fast-charging elastic accumulator such as a spiral spring, which has its output connected to an inertia flywheel which is in turn integrally connected to the output of the transmission.

A description of the drawings included in the present specification is carried out below.

Figure 1:
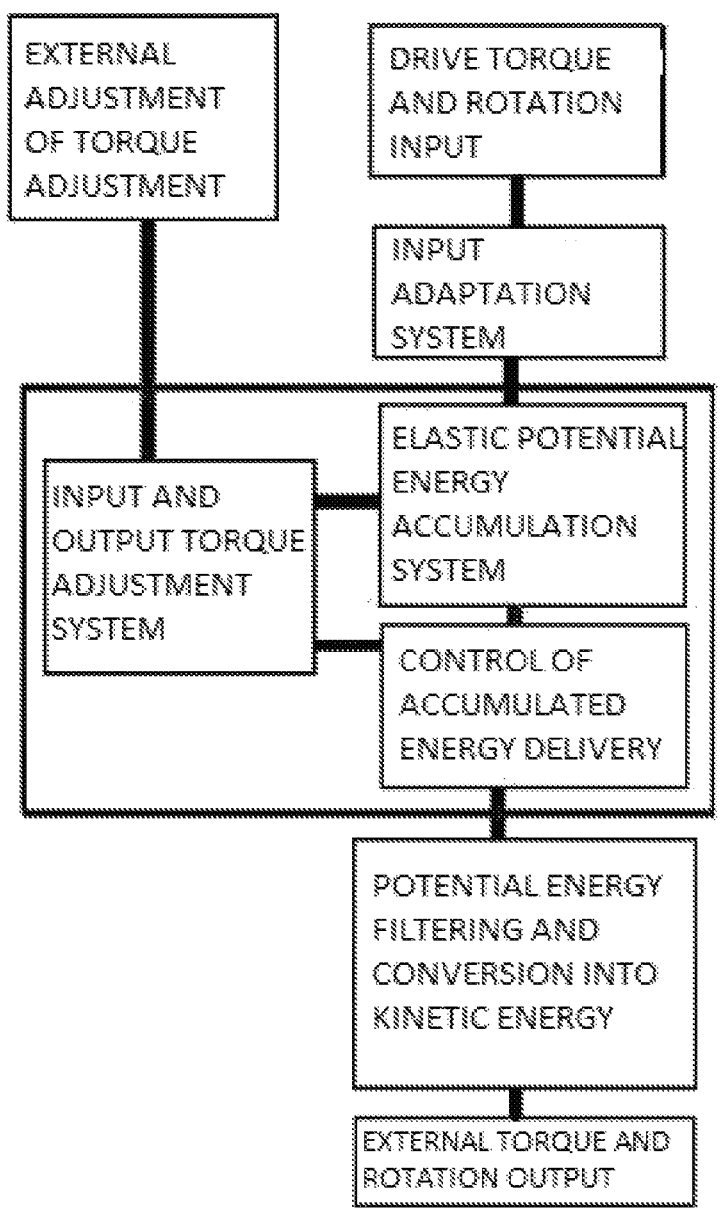
FIG. 1 is a flowchart in which the internal and functional composition of the transmission, object of the present specification, is represented.
Figure 2:
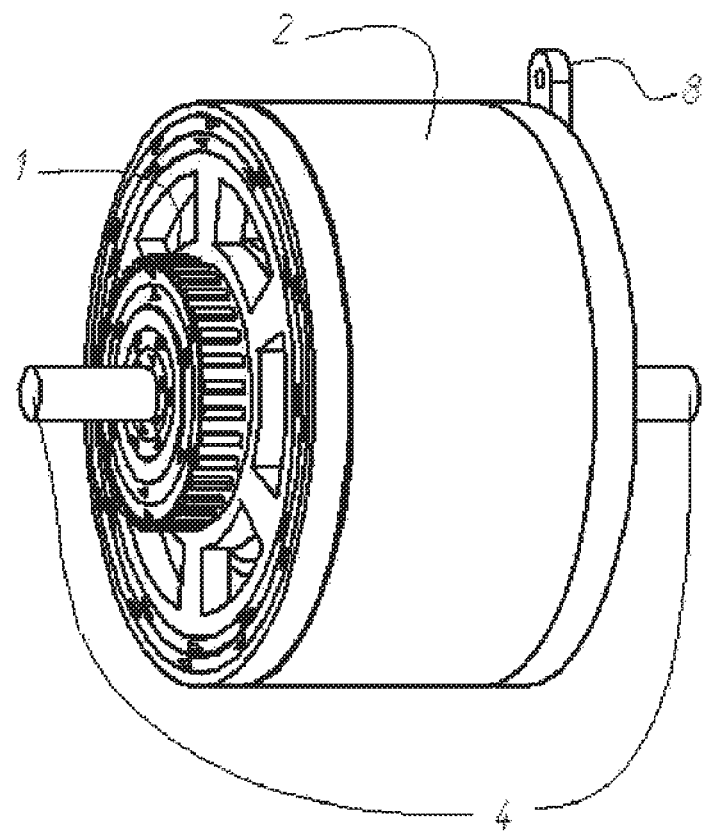
FIG. 2 is a perspective view of a preferred embodiment of a transmission of the functional type described, in which one may see the cogwheel that is the rotational movement (1) input element, the element that delivers the rotation output to the outside (2), which is a tubular cylindrical body that covers the mechanisms of the transmission, the adjustment control (8) of the output control system of the accumulator and the fixed shaft (4) that serves as a base and support for placing the different groups of mechanisms.
Figure 3:
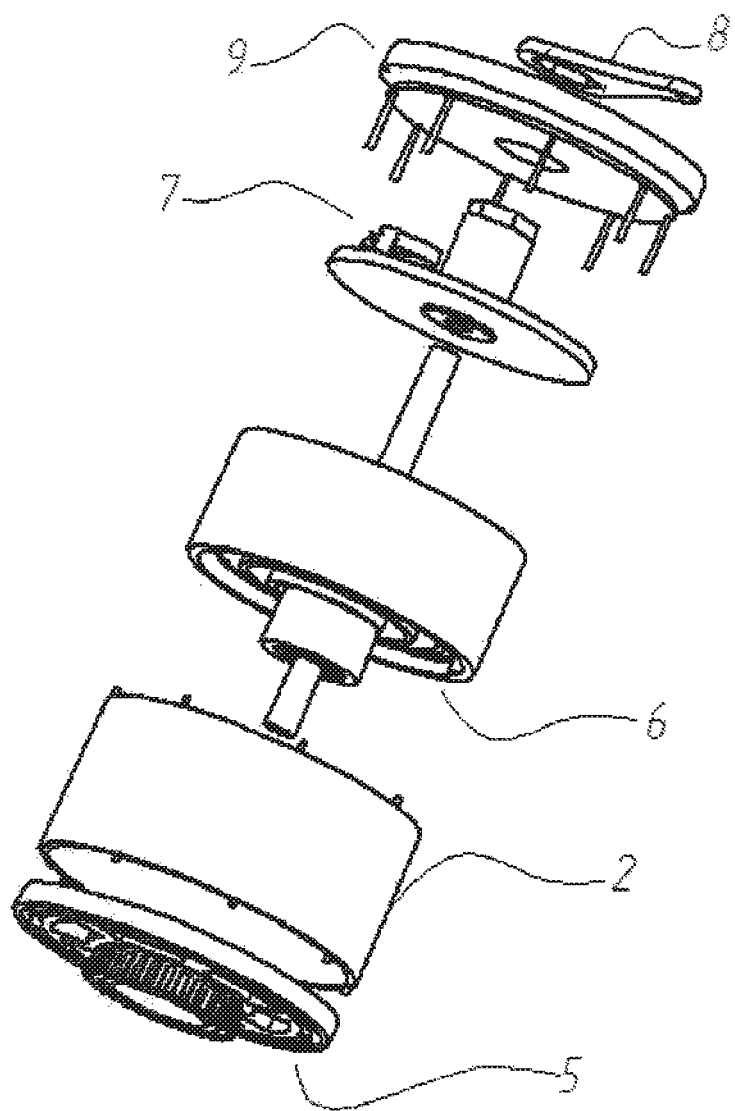
FIG. 3 is an exploded view of the aforementioned transmission, in which one may see the input adaptor system of the transmission (5), the rotation output element to the outside of the transmission (2), the energy accumulator (6), where a rotation control device (7) of the output of the aforementioned accumulator is mounted, the adjustment control (8) by means of which it is possible to adjust the actuation of the rotation control device, and lastly, one may see the output system with impulse filtering (9), which is connected by means of the cylindrical body that forms the output (2), with the input adaptor system of the transmission (5).
Figure 4:
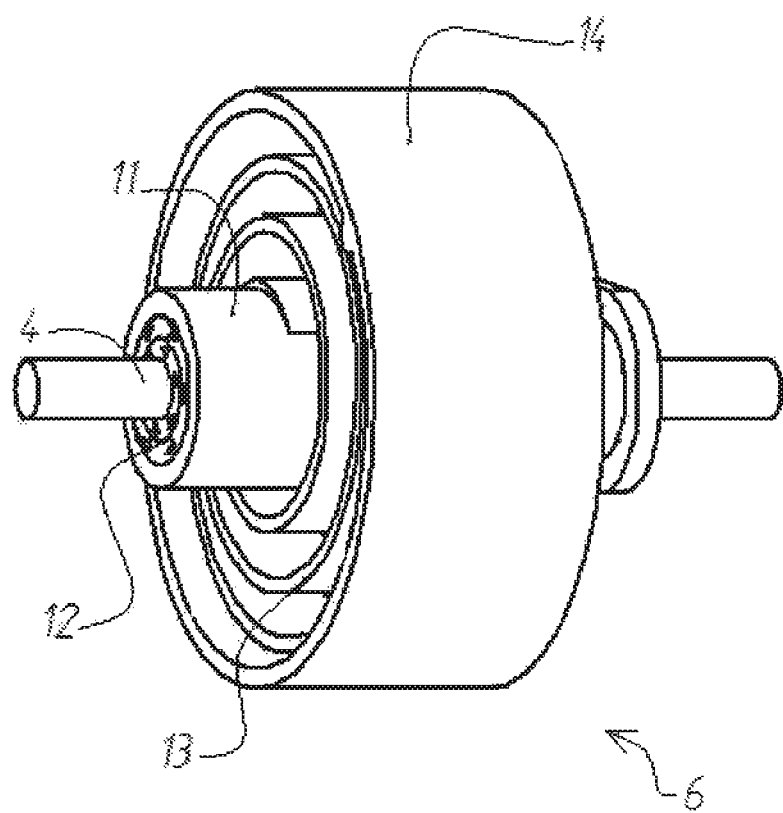
FIG. 4 is a perspective view of the elastic potential energy accumulation device (6), where one may see the rotation input (11) of the accumulator, linked by means of a freewheel (12) to the fixed carrier shaft (4), such that the freewheel only enables rotation in the direction for accumulating elastic energy in the accumulator, the elastic accumulator is a spiral spring (13) with the inner end fastened to the rotation input (11) and the outer end fastened to the output of the accumulator, the output element (14) of the elastic accumulator is a tubular cylindrical body that covers the system and which is linked to the rotation control system thereof through the means that said control system has for blocking or enabling the rotation of said output body.
Figure 5:
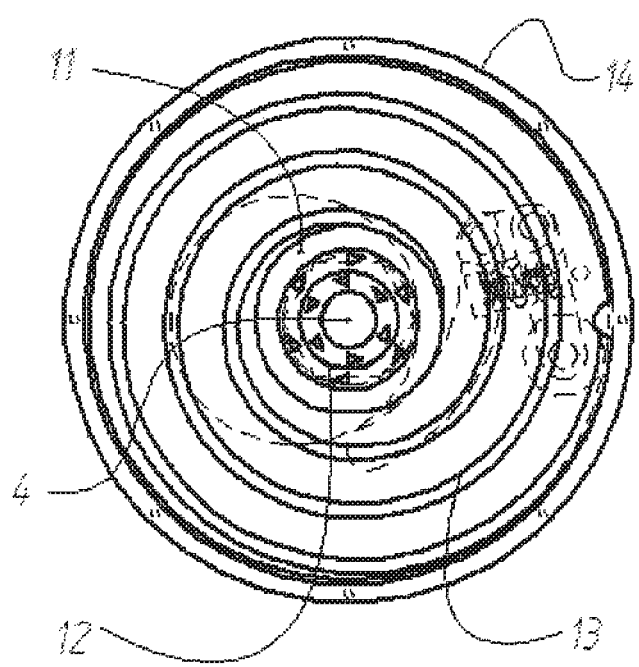
FIG. 5 is front view of the accumulator of elastic potential energy, in this view the same elements as in FIG. 4 may also be seen, and the dashed lines show the hidden lines of the pieces that form the output control device that blocks or enables the rotation of the tubular cylindrical output body (14) of the accumulator system with controlled output.
Figure 6:
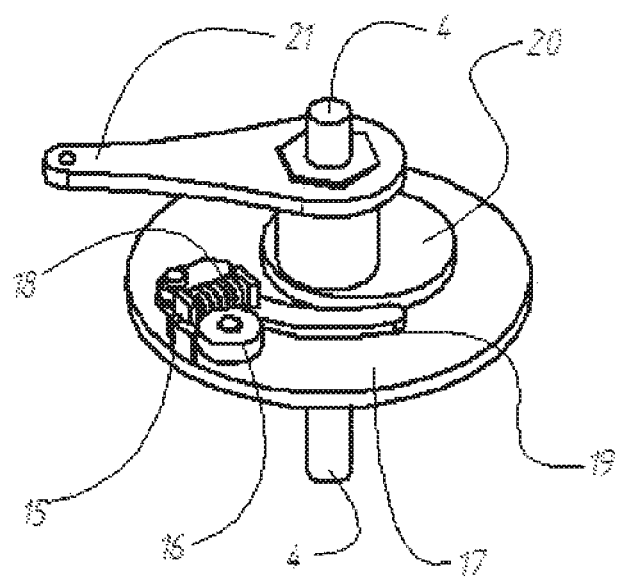
FIG. 6 is a perspective view of a rotation control device (7) of the output of the accumulator, where one may see the ratchet (15) that is fastened in the tubular cylindrical output body (14) of the accumulator, the blocking wheel (16) with its mechanisms to operate as a blocking and passage element, which are mounted on the support disc (17) of said mechanisms, the effect of the blocking wheel may be adjusted by means of more or less pressure, caused therein by the pressure spring (18), pressed by the lever (19), the pressure of which on the aforementioned spring (18) may be controlled by means of the rotation of the adjustment disc (20) which is eccentrically mounted, the pressure adjustment disc is rigidly fastened to the support tube (21), the angular position of which may be adjusted from the adjustment control (8). The support disc (17) is rigidly fastened to the fixed shaft (4) that serves as a support base for the transmission.
Figure 7:
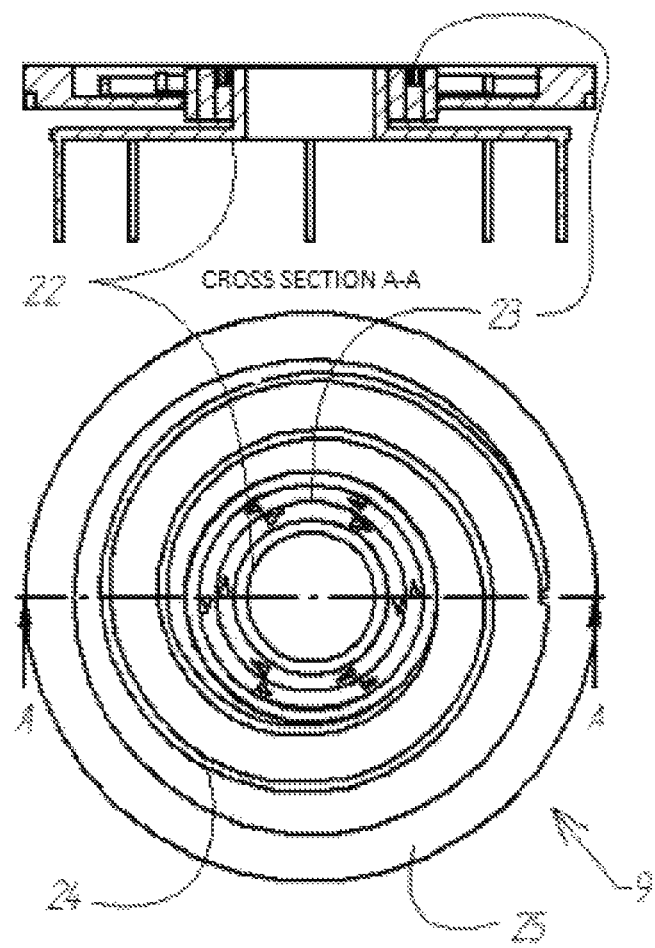
FIG. 7 is a front view with a cross-sectional view of the adaptation system of the output of the transmission (9) where one may see that this system with impulse filtering has an input piece that is a discoid body with a tubular protuberance in the inner portion (22) thereof, this input piece is connected by the outer portion thereof to the controlled output of the accumulator (13) and by the inner portion thereof from the tubular protuberance, with a freewheel (23), which transmits the rotation pulses to the inside of the spiral spring (24) which carries out the function of fast-charging elastic accumulator, with the aim of transmitting absorbed pulsing energy, this spiral spring is fastened by the outer portion thereof to the inertia flywheel (25) that is in turn fastened to the external output of the transmission (2).
Figure 8:
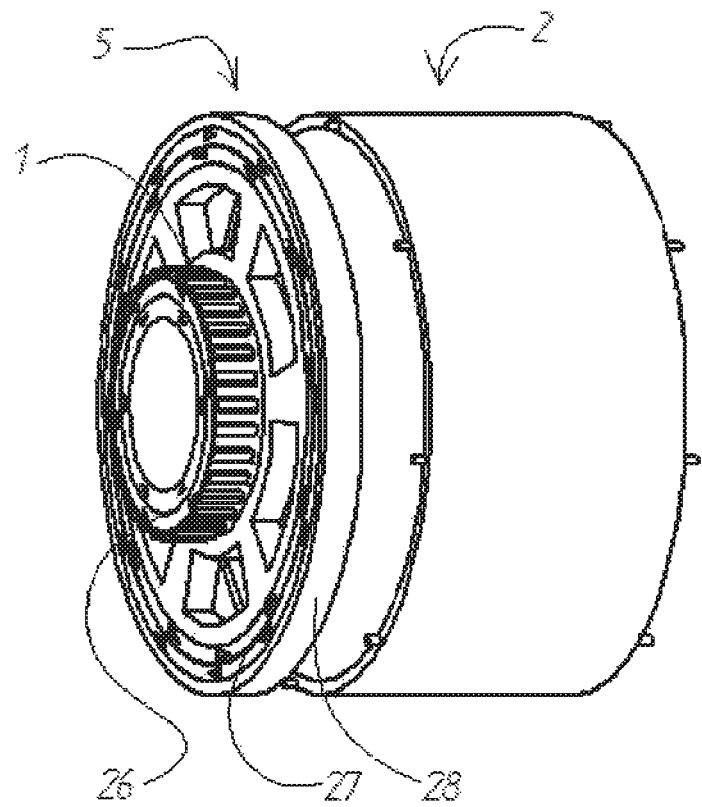
FIG. 8 is a perspective view of the input adaptor system of the transmission (5) and the rotation output element to the outside (2) of the transmission, where one may see that the output adaptor system is formed by a discoid-shaped body with a tubular protuberance in the area closest to the central shaft, integrated on this protuberance there is a cogwheel (1) from where the rotation input from the outside movement is provided, this body is connected through the inside by means of a freewheel (26) to the input shaft of the energy accumulator with controlled output, additionally being connected by the outside through another freewheel (27), by means of the tubular cylindrical body for connecting (28) to the external output of the transmission (2).

The drawings having been described and the basic operation of the continuously variable transmission system having been sufficiently explained, the preferred embodiment of the invention shall be described below as an example.

DESCRIPTION OF SPECIFIC EMBODIMENT OF THE INVENTION

A non-limiting, preferred embodiment of a transmission system, such as the one described, carried out for its use in bicycles, is described below.

Based on a system like the one described as an essential part of the composition, several different transmissions may be carried out. In particular, the continuously variable transmission that is described as an example is conceived for its specialised application in different types of bicycle.

A transmission like the one described is carried out that is designed and sized for its use in a bicycle such that the output of the transmission may support the driving wheel of the bicycle, the fixed shaft (4) is held in the fastening fork, the torque adjustment is carried out by accessing the adjustment control (8) by means of a cable from the tip of the fork, and additionally, at the movement input (1), a cogwheel or sprocket may be adapted depending on whether the driving force is transmitted by belt or chain.

The preferred embodiment applied for its use in bicycles uses an input sub-assembly that transmits the rotation through two channels, the first directly to the output of the transmission through the freewheel (27), and the second to the input of the energy accumulator with controlled output through the freewheel (26). Initially, when driving force is applied in the input (1), the same rotation is caused in the output (2), at the same time as causing the rotation of the input of the accumulator, the gradual charging thereof by accumulation of energy is caused.

By transmitting the rotation at the rotation input (11) of the accumulator, the spring (13) is wound and the elastic tension in the same is increased by the accumulation of energy, given that the rotation input of the accumulator (11) is connected by means of a freewheel (12) to the fixed shaft (4), this input may only rotate in one direction and therefore it is only possible to charge the accumulator from the same.

The output of the accumulator (14) that is a tubular cylindrical body may release energy by rotating in the direction that the spring (13) forces it to, the rotation of this output body (14) is controlled by the rotation control device (7) of the output of the accumulator (6) is, in this preferred embodiment, an adjustable pressure blocking system, which enables the rotation when the torque of the output of the accumulator reaches the torque value that has been determined by means of adjusting the rotation control device.

The rotation control device is made up of a blocking wheel (16), which blocks the rotation of the output of the accumulator (14), blocking the passage of the ratchet (15) that is fastened on the output body of the accumulator, in order to enable the blocking of the ratchet (15) through the blocking wheel (16), this wheel is fastened to an arm pressed by a spring (18), the pressure of which is adjusted from the lever (19), which is in turn pressed by the eccentrically mounted disc (20), this disc is rigidly fastened to the tube (21) and the angular position of both may be modified by rotating them from the adjustment lever (8); the entire system is mounted on a support disc (17) that is rigidly fastened to the fixed shaft (4), such that the rotation control device (7) may block the rotation of the output of the energy accumulator by means of the blocking wheel (16).

The rotation output of the energy accumulator with the torque determined by the adjustment of the rotation control device, is caused by discontinuous sections, therefore these sections must be converted into continuous rotation at the output, and to do so, a unidirectional device is used, which in the case of this preferred embodiment, is not only a freewheel, but rather it is an output system with impulse filtering.

The output system with impulse filtering (9) is connected to the output of the energy accumulator, the connection with the impulse output is carried out by means of an adaptor connection piece (22), this piece is a disc that has a tubular cylindrical protuberance at the centre thereof, and is connected by the outer portion thereof via ratchets or another means to the tube of the output of the accumulator, and by the tubular cylindrical protuberance it is connected to the inner portion of a freewheel device (23), the outer portion of which is connected to the input of a fast-charging elastic accumulator (24), which in this case is a spiral spring, the other end of the fast-charging accumulator, i.e. the outer portion of the spiral spring, being connected to an inertia flywheel (25), which contributes to the filtering of output pulses. The inertia flywheel is rigidly connected, forming part thereof, to the output of the transmission that is the tubular, cylindrical-shaped body (2), from where the rotation output of the transmission is arranged.

In this preferred embodiment the input adaptor system of the transmission (5), is formed of a mechanical assembly formed around a discoid-shaped body with a tubular cylindrical protuberance in the centre thereof, where a cogwheel is integrated, the function of which is the rotation input; in the body there is a freewheel device arranged inside the cylindrical protuberance, through this freewheel it is connected to the input of the energy accumulator, additionally the body we are concerned with is connected by the outer perimeter of the disc thereof through another freewheel (27), fitted into the tubular body (28), with the cylindrical tubular body of external output of the transmission (2).

What is claimed is:

1. A continuously variable automatic transmission comprising:
    an input shaft (1) arranged so as to receive rotational movement and input torque from a movement source, a mechanical system that converts rotational movement and input torque into a rotational movement with an output torque that is adapted to the load requirements in each circumstance, an external output shaft (2) of the transmission integrated in a mechanical sub-assembly (9), configured to deliver rotational movement and the torque adapted to the forces required in this output, characterised in that:
    The input shaft of the transmission (1) is connected to the input of at least one mechanical subsystem for energy accumulation (6) with controlled output by a control device (7), this subsystem having its own input and output, the subsystem transforms the rotational movement of the input (11) thereof into elastic potential energy contained in the inside (13) thereof and may deliver the accumulated energy by means of the rotation of the output (14) thereof, the rotation of the output thereof being controlled by a control system (7), the output shaft of the energy accumulation subsystem with controlled output is connected to the input of a mechanical filtering subsystem and output of the transmission, this subsystem having its own input and output, configured such that it has, connected to its own input (22), at least one freewheel device (23) and associated with its own output (25) at least one connection with an inertial mass that accumulates kinetic energy; the output of the subsystem (25) is connected to the output shaft (2) of the transmission.

2. The continuously variable and automatic transmission according to claim 1, characterised in that: the input shaft arranged to receive input rotation and torque from a driving source is coupled to the input of the energy conversion system by means of a freewheel device housed in the inner portion thereof, in order to transmit the rotational movement only in the charging direction of the energy accumulation system, the input shaft is connected through the outer portion thereof to the output element of the transmission through another freewheel device to transmit movement only in the rotation direction of the output.

3. The continuously variable and automatic transmission according to claim 1, characterised in that: the mechanical energy accumulation system is configured such that, coaxially mounted on a fixed support shaft (4), from inside to outside successively mounted, is a freewheel device mounted on the fixed support shaft (4), on this freewheel device (12) the input shaft of the energy accumulator is arranged, configured by means of a spiral spring (13), the inner portion of which is connected to the input shaft of the accumulator (11) such that it is only possible to rotate the input shaft of the accumulator in the energy charging direction, the outer portion of the spiral spring (13) being connected to the rotation output body of this system (14) and the rotation capacity of this output body being controlled from a device enabling the rotation or blocking thereof (7).

4. The continuously variable and automatic transmission according to claim 3 characterised in that: the blocking device (7) is configured such that, by means of a rotating wheel (16) that is held to the shaft thereof, on a support arm that may rotate in turn on its shaft enabling the wheel to move backwards, such that the trajectory of the rotational movement of a ratchet (15) fastened on the output body, may be blocked or enabled; the support arm that supports the blocking wheel is pressed from another auxiliary arm (19) by means of a pressure spring (18) contained between both arms, the auxiliary arm is pressed by means of a disc (20) mounted eccentrically around the support shaft (4), the eccentric disc (20) is held at one end of a tube (21) mounted coaxially on the support shaft (4) arranged with free rotation limited such that by rotating this tube by means of a control (8) the eccentric disc (20) is rotated, thus enabling the pressure of the spring and the blocking wheel to be adjusted.

5. The continuously variable and automatic transmission according to claim 1 characterised in that: the mechanical filtering and output subsystem comprises a discoid-shaped input body (22) with a tubular cylindrical protuberance that is held by the discoidal portion thereof to the output (14) of the energy accumulation system with controlled output and that has, mounted coaxially from the inside to the outside on the tubular cylindrical protuberance thereof, a freewheel device (23), a spiral spring (24) and an inertia flywheel (25) that is connected to the output body of the transmission, the spiral spring being connected by the lower portion thereof by means of a fastening ring to the freewheel device, and by the outer portion thereof to the inertia flywheel (25).

* * * * *

UNITED STATES PATENT AND TRADEMARK OFFICE
CERTIFICATE OF CORRECTION

PATENT NO. : 10,309,505 B2
APPLICATION NO. : 15/316843
DATED : June 4, 2019
INVENTOR(S) : Jose Antonio Carames Jimenez Page 1 of 1

It is certified that error appears in the above-identified patent and that said Letters Patent is hereby corrected as shown below:

On the Title Page

In the items titled (71) Applicant and (72) Inventor:
After "El Vendrell" insert the following: -- (Tarragona) --

Item (30) Foreign Application Priority Data:
"201430904" should be changed to -- P201430904 --

Signed and Sealed this
Third Day of September, 2019

Andrei Iancu
*Director of the United States Patent and Trademark Office*